United States Patent
Winkler et al.

(10) Patent No.: US 6,758,034 B1
(45) Date of Patent: Jul. 6, 2004

(54) METHOD FOR OPERATING AN INTERNAL COMBUSTION ENGINE

(75) Inventors: Klaus Winkler, Rutesheim (DE); Christian Koehler, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,517

(22) PCT Filed: Aug. 24, 2000

(86) PCT No.: PCT/DE00/02900
§ 371 (c)(1),
(2), (4) Date: Jul. 10, 2002

(87) PCT Pub. No.: WO01/18367
PCT Pub. Date: Mar. 15, 2001

(30) Foreign Application Priority Data

Sep. 4, 1999 (DE) .......................... 199 42 270

(51) Int. Cl.⁷ ................................ F01N 3/00
(52) U.S. Cl. ...................... 60/285; 60/274; 60/276; 60/277
(58) Field of Search .................. 60/274, 276, 277, 60/285, 295, 299

(56) References Cited

U.S. PATENT DOCUMENTS

| | | | | |
|---|---|---|---|---|
| 5,428,955 A | * | 7/1995 | Yuuki et al. | 60/276 |
| 5,528,898 A | * | 6/1996 | Nakayama et al. | 60/276 |
| 5,577,382 A | * | 11/1996 | Kihara et al. | 60/276 |
| 5,644,912 A | * | 7/1997 | Kawamura | 60/276 |
| 5,727,383 A | * | 3/1998 | Yamashita et al. | 60/276 |
| 6,026,640 A | * | 2/2000 | Kato et al. | 60/276 |
| 6,058,701 A | * | 5/2000 | Mashiki | 60/285 |
| 6,161,378 A | * | 12/2000 | Hanaoka et al. | 60/286 |
| 6,171,565 B1 | * | 1/2001 | Hohne et al. | 423/239.1 |
| 6,216,451 B1 | * | 4/2001 | Schnaibel et al. | 60/277 |

FOREIGN PATENT DOCUMENTS

| | | |
|---|---|---|
| DE | 198 51 564 | 5/2000 |
| EP | 0 690 213 | 1/1996 |
| EP | 0 903 477 | 3/1999 |
| EP | 0 931 914 | 7/1999 |
| EP | 0 969 194 | 1/2000 |

* cited by examiner

Primary Examiner—Thomas Denion
Assistant Examiner—Diem Tran
(74) Attorney, Agent, or Firm—Kenyon & Kenyon

(57) ABSTRACT

An internal combustion engine in a motor vehicle, for example, is equipped with a combustion chamber, into which fuel may be injected in a rich mode of operation and in a lean mode of operation, and is also equipped with a catalyst, in which nitrogen oxides may be stored. A control unit is provided for switching between rich and lean modes of operation, for determining a quality function for storage of nitrogen oxides in the catalyst, and for switching between these modes of operation as a function of the quality function.

7 Claims, 3 Drawing Sheets

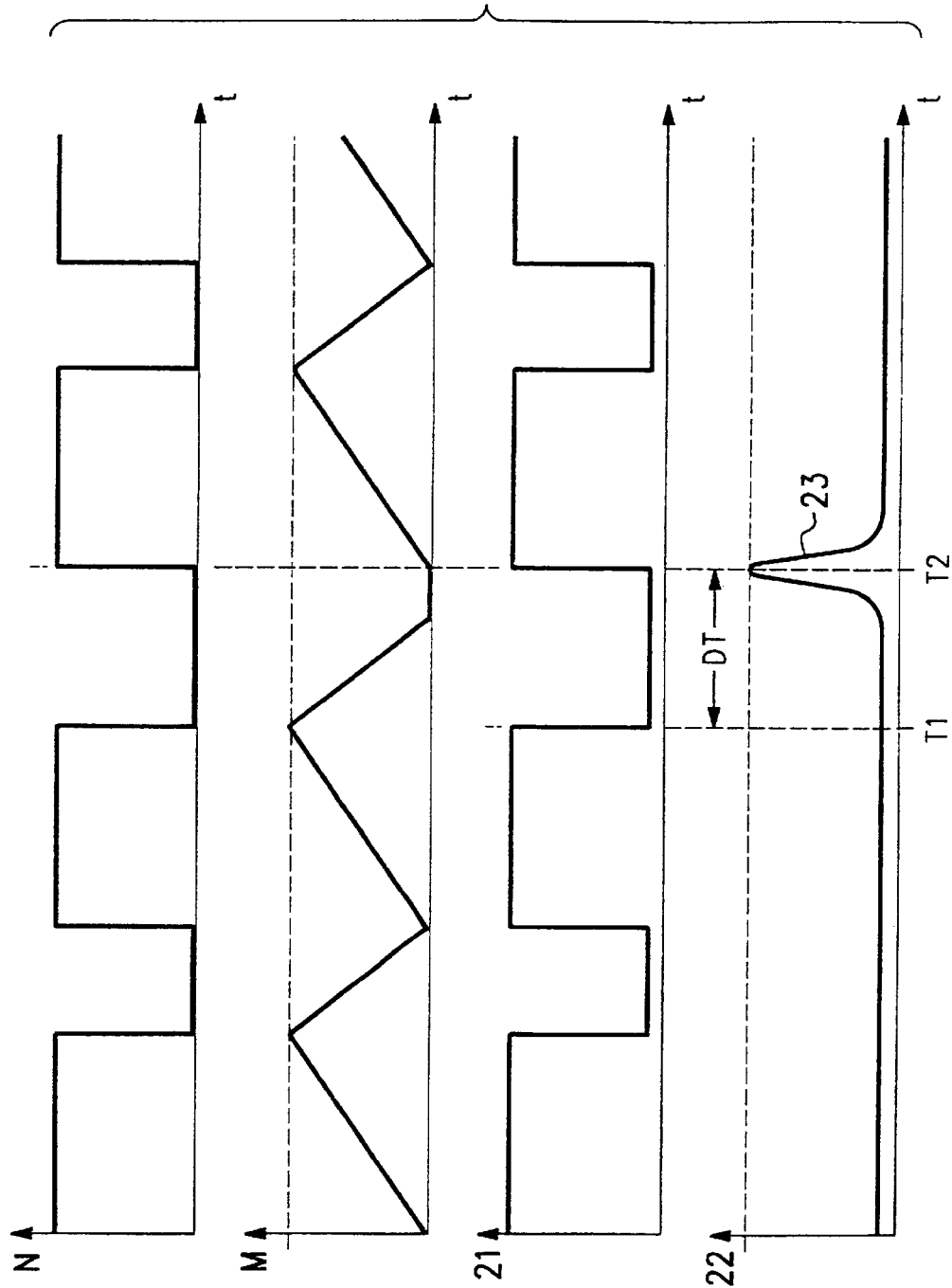

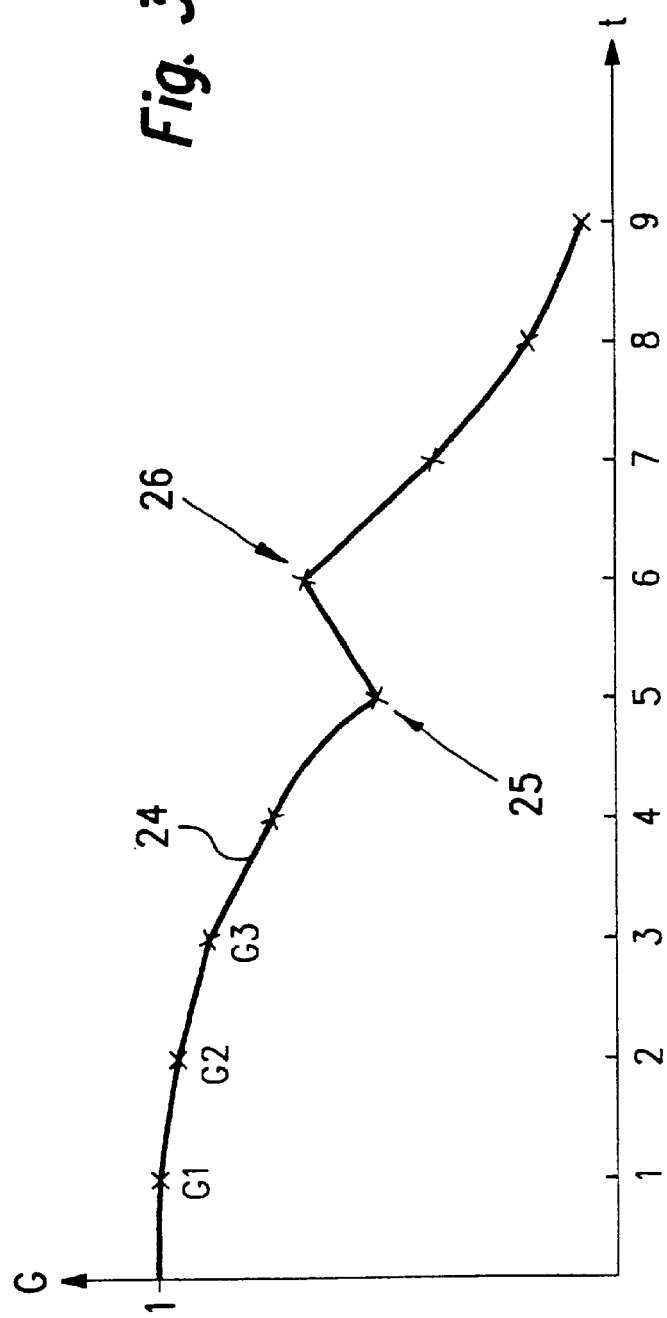

METHOD FOR OPERATING AN INTERNAL COMBUSTION ENGINE

FIELD OF THE INVENTION

The present invention relates to a method for operating an internal combustion engine of a motor vehicle, for example, in which fuel is injected into a combustion chamber in a rich mode of operation and a lean mode of operation, switching between the rich and lean modes of operation, and nitrogen oxides are stored in a catalyst. The present invention also relates to a corresponding internal combustion engine and a control unit for an internal combustion engine.

BACKGROUND INFORMATION

An internal combustion engine and a control unit may be used to direct gasoline injection, for example, fuel may be injected into a combustion chamber of the internal combustion engine during the intake phase in a rich mode of operation, e.g., in homogeneous operation or during the compression phase in a lean mode, e.g., in stratified charge operation. Homogeneous operation may be provided for full-load operation of the internal combustion engine, while stratified charge operation may be suitable for idling and partial load operation. With an internal combustion engine having direct injection, the two modes of operation described above may be switched between, e.g., as a function of a desired setpoint mode of operation.

NOx components, i.e., nitrogen oxides, may be present in the exhaust gas in lean stratified charge operation, for example, and may not be aftertreated by a three-way catalyst. For this purpose, a storage catalyst may be provided that stores the nitrogen oxides, converts the oxides in a subsequent rich operating mode of the internal combustion engine, and then releases them again. Since the storage capacity of the storage catalyst is limited, it should be loaded and unloaded constantly. This may be controlled and/or regulated using a lambda sensor upstream from the catalyst, for example, by modeling the storage capacity of the storage catalyst.

Due to aging of the internal combustion engine, changes may occur in the modeling, and thus there may be errors. These errors may cause a permanently defective control and/or regulation of the loading and unloading of the storage catalyst.

An object of an exemplary embodiment and/or exemplary method according to the present invention is to provide a method for operating an internal combustion engine, with which the loading and unloading of the storage catalyst is controlled and/or regulated correctly, even over a long period of time.

An exemplary method according to the present invention may achieve this object by determining a quality function for the storage of nitrogen oxides in the catalyst, the switching between the operating modes being influenced as a function of the quality function. This object may be achieved using an internal combustion engine and a control unit.

The quality function may have a declining characteristic, due to aging or poisoning of the catalyst. If this declining characteristic changes, whether a change has occurred in the internal combustion engine may be deduced, e.g., due to aging. If this occurs, the model for switching between the operating modes of the internal combustion engine may be adapted, so that the quality function develops into a declining characteristic again.

Aging phenomena of an internal combustion engine may be detected on the basis of the quality function and may be considered by the control unit accordingly.

In an exemplary embodiment and/or exemplary method according to the present invention, the quality function is determined as a function of the period of time, after which a rich mode of operation breaks through the catalyst. Breakthrough of the rich mode of operation may be detected using a lambda sensor situated downstream from the catalyst, for example. The breakthrough indicates that the catalyst has released all the NOx stored components and that reducing agents, in the form of "rich" exhaust gas, have reached the downstream lambda sensor. The period of time described above is a measure of the storage capacity of the catalyst. Over time, the duration of the period of time becomes progressively shorter, representing the aging and/or poisoning of the catalyst.

In another exemplary embodiment according to the present invention, the quality function is determined as a function of a plurality of successive periods of time. The change in the quality function over time is thus considered.

In another exemplary embodiment according to the present invention, a change in a slope of the quality function curve is determined. A change in the internal combustion engine, due to aging, may be deduced, for example, on the basis of the change in slope of the quality function curve.

It is believed to be advantageous if the-switching between modes of operation is adapted. The loading and/or unloading times for the storage of nitrogen oxides in the catalyst may be adapted.

In an exemplary method according to the present invention, which may be performed by a control element of a control unit of an internal combustion engine, for example, in a motor vehicle, and a program, which runs on a computer, for example, on a microprocessor, and which is suitable for executing an exemplary method according to the present invention, is stored on the control element. Thus, the exemplary method according to the present invention is implemented by a program stored on the control element, so that the control element, provided with the program, performs, in the same way, as an exemplary method according to the present invention. An electric storage medium, such as, for example, a read-only memory or a flash memory, may be provided as the control element.

BRIEF DESCRIPTION OF THE DRAWINGS

FIG. 2 shows four schematic time diagrams for an exemplary method according to the present invention for operating the internal combustion engine of FIG. 1.

FIG. 3 shows another schematic time diagram for the exemplary method according to the present invention of FIG. 2.

DETAILED DESCRIPTION

Figure 1:
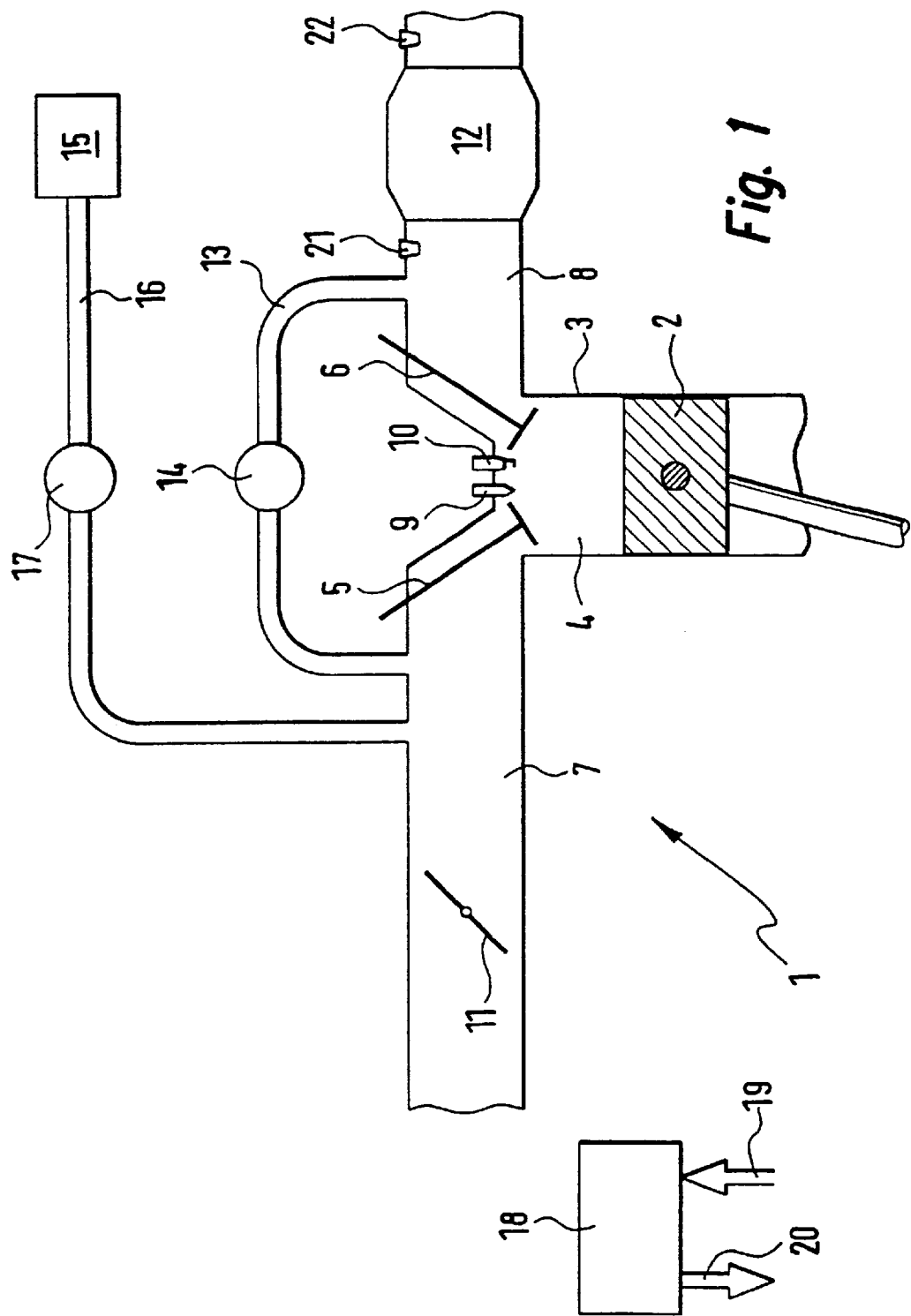
FIG. 1 is a schematic block diagram showing an exemplary internal combustion engine according to the present invention.

FIG. 1 shows an internal combustion engine 1 of a motor vehicle, in which a piston 2 is movable back and forth in a cylinder 3. Cylinder 3 includes a combustion chamber 4, which is delimited by piston 2, intake valve 5 and exhaust valve 6. An intake manifold 7 is connected to intake valve 5, and an exhaust gas pipe 8 is connected to exhaust valve 6.

In the area of intake valve 5 and exhaust valve 6, a fuel injector 9 and a spark plug 10 extend into combustion chamber 4. Fuel may be injected through fuel injector 9 into combustion chamber 4. Fuel in combustion chamber 4 may be ignited by spark plug 10.

A rotatable throttle valve 11, through which air may be supplied to intake manifold 7, is mounted in intake manifold 7. The amount of air supplied depends on the angular position of throttle valve 11. A catalyst 12 is provided in exhaust gas pipe 8 for cleaning the exhaust gases formed by combustion of the fuel.

An exhaust gas recirculation pipe 13 leads from exhaust gas pipe 8 back to intake manifold 7. An exhaust gas recirculation valve 14 for adjusting the amount of exhaust recirculated to intake manifold 7 is mounted in exhaust gas recirculation pipe 13. Exhaust gas recirculation pipe 13 and exhaust gas recirculation valve 14 form an exhaust recirculation system.

A fuel tank venting line 16 leads from a fuel tank 15 to intake manifold 7. A fuel tank venting valve 17 for adjusting the amount of fuel vapor supplied from fuel tank 15 to intake manifold 7 is provided in fuel tank venting line 16. Fuel tank venting line 16 and fuel tank venting valve 17 form a fuel tank venting system.

A reciprocating movement of piston 2 is induced by the combustion of fuel in combustion chamber 4 and is transmitted to a crankshaft (not shown), applying a torque to the crankshaft.

A control unit 18 receives input signals 19 representing performance quantities of internal combustion engine 1 measured by sensors. For example, control unit 18 may be connected to an air flow sensor, a lambda sensor and a rotational speed sensor. In addition, control unit 18 is connected to an accelerator pedal sensor that generates a signal indicating the position of a driver-operated accelerator pedal and thus indicates a desired torque. Control unit 18 generates output signals 20 for influencing the performance of internal combustion engine 1 by actuators or servomotors. For example, control unit 18 may be connected to injector 9, spark plug 10 and throttle valve 11, and generate signals required to control them.

Control unit 18 controls and/or regulate the performance quantities of internal combustion engine 1. For example, the fuel mass injected by injector 9 into combustion chamber 4 may be controlled and/or regulated by control unit 18 for low fuel consumption and/or low output of pollutants. For this purpose, control unit 18 includes a microprocessor, which includes a program stored in a storage medium, for example, in a flash memory suitable for performing the control and/or regulation described above.

The internal combustion engine 1 of FIG. 1 may be operated in a plurality of modes of operation, such as, for example, a homogeneous mode operation, a stratified charge mode of operation or a homogeneous lean mode of operation. The operating modes of internal combustion engine 1 may also be switched between. Such switching may be performed by control unit 18.

In homogeneous operation, fuel is injected by fuel injector 9 directly into combustion chamber 4 of internal combustion engine 1, during the intake phase. The fuel is largely swirled until ignition, thus forming a substantially homogeneous fuel-air mixture in combustion chamber 4. The torque produced may be adjusted by control unit 18 using the position of throttle valve 11. In homogeneous operation, the performance quantities of internal combustion engine 1 may be controlled and/or regulated, so that lambda is equal to one. Homogeneous operation may be used at full load, for example.

In stratified charge operation, fuel is injected by fuel injector 9 directly into combustion chamber 4 of internal combustion engine 1, during the compression phase. Therefore, a homogeneous mixture may not be present in combustion chamber 4 in ignition by spark plug 10, but instead the fuel may be stratified. Throttle valve 11 may be opened completely, regardless of the requirements of exhaust gas recycling and/or fuel tank venting, for example, and internal combustion engine 1 may thus be operated at full throttle. The torque produced may be set using the fuel mass in stratified charge operation. Internal combustion engine 1 may be operated using stratified charge operation, for example, in idling and at partial load.

Catalyst 12 is a combination of a three-way catalyst and a storage catalyst. With the three-way catalyst, harmful constituents of the exhaust gas may be aftertreated or converted continuously, depending on the mode of operation. However, the three-way catalyst may not be capable of processing the NOx components formed in stratified charge operation. The storage catalyst is provided for this purpose.

The storage catalyst binds the NOx components of the exhaust gas in lean operation of internal combustion engine 1, i.e., with an excess of oxygen, e.g., during stratified charge operation. If internal combustion engine 1 is operated with an excess of fuel, i.e., in the rich range, the storage catalyst releases the bound NOx components again, so that they may be reduced and thus aftertreated by the three-way catalyst.

In the first time diagram at the top of FIG. 2, NOx emissions N of internal combustion engine 1 are plotted over time t. This time diagram shows that internal combustion engine 1 releases nitrogen oxides during a stratified charge operation, i.e., in a lean mode of operation, whereas in homogeneous operation, i.e., during a rich mode of operation, the NOx raw emissions are not considered and are equated to zero.

In the second time diagram of FIG. 2, mass M of the NOx components stored in the storage catalyst is plotted over time t. This time diagram shows that the storage catalyst takes up the nitrogen oxides released by internal combustion engine 1 during stratified charge operation and stores them. Mass M thus increases steadily. During homogeneous operation, the storage catalyst releases the stored nitrogen oxides again, so that mass M decreases again steadily.

The storage capacity of the storage catalyst is not unlimited. For this reason, the remaining storage capacity of the storage catalyst is determined by control unit 18 using a model. As soon as the storage capacity is exhausted due to prolonged loading of the storage catalyst, internal combustion engine 1 is switched, by control unit 18, to a rich mode of operation, so that the storage catalyst is unloaded again and thus the storage capacity is again increased. As soon as the storage catalyst is unloaded, it may be switched over again by control unit 18, and thus the storage catalyst may be loaded again.

The modeling of the storage catalyst and the resulting control and/or regulation of the operating models of internal combustion engine 1 by control unit 18 results in the alternating switching between stratified charge operation and homogeneous operation as shown in the first and second time diagrams of FIG. 2.

A lambda sensor 21, which is provided upstream from catalyst 12, is connected to control unit 18 and controls and/or regulates the subsequent loading and unloading of the storage catalyst. The output signal of the lambda sensor 21 is shown schematically in the third time diagram of FIG. 2.

For simplification, the output signal is labeled with the same reference notation as that used for lambda sensor 21.

Operation of internal combustion engine 1 in stratified charge operation and in homogeneous operation may be determined from output signal 21. In stratified charge operation, i.e., in the case of lambda sensor 21 according to output signal 21 of FIG. 2, the exhaust gas upstream from catalyst 12 has a large lambda value, corresponding to lean operation of internal combustion engine 1. In homogeneous operation, however, output signal 21 has a lambda value equal to one, for example, and thus may be smaller than that in stratified charge operation.

Downstream from catalyst 12 there is another lambda sensor 22, which is also connected to control unit 18. The output signal of this lambda sensor 22 is shown schematically in the fourth time diagram of FIG. 2. For simplification, this output signal is labeled with the same reference notation as that used for lambda sensor 22.

Output signal 22 of FIG. 2 indicates when a rich mode of operation of internal combustion engine 1, e.g., homogeneous operation, "breaks through" catalyst 12. This occurs when the storage catalyst is completely unloaded, i.e., when no more NOx components are stored in the catalyst. Reducing agents in the form of "rich" exhaust gas are then no longer being bound by the NOx components released by the storage catalyst, but instead they reach lambda sensor 22, where they result in the generation of output signal 22.

In the time diagrams of FIG. 2, the engine is switched to homogeneous operation at a time T1. Starting from this time T1, it is determined when the rich mode of operation "breaks through." For this purpose, no switch-back to stratified charge operation occurs after time T1, as usual, according to modeled stored mass M, as soon as the storage catalyst is unloaded, but instead homogeneous operation is maintained.

This then results in a pulse 23 at a time T2 in the lower, fourth time diagram of FIG. 2. This pulse 23 indicates that the rich mode of operation "breaks through" catalyst 12.

At time T2 of pulse 23, the engine is switched back to stratified charge operation. Due to the switch of internal combustion engine 1 from homogeneous operation to stratified charge operation, pulse 23 is present only briefly. However, a period of time DT may be determined on the basis of pulse 23 as the difference between times T1 and T2.

The period of time DT represents the lag time, after which the storage catalyst no longer binds the incoming reducing agent in the form "rich" exhaust gas after completely unloading NOx components, so that this "rich" exhaust reaches lambda sensor 22, where it triggers a pulse 23. This lag time becomes smaller and smaller due to aging phenomena and/or poisoning of the catalyst. Pulse 23 thus appears sooner and sooner.

FIG. 3 shows a curve 24 plotted over time t, obtained from a plurality of such periods of time DT. Curve 24 is a quality function G for the storage catalyst.

FIG. 3 shows successive times 1, 2, 3, etc., in which period of time DT is determined as described above, and from this, the respective values G1, G2, G3, etc., are determined. Curve 4 is then obtained by connecting the values G1, G2, G3, etc.

Curve 24 may be obtained, for example, by appropriate normalization from the periods of time DT at successive times 1, 2, 3, etc. Likewise curve 24, for example, may also be determined with the help of a NOx sensor.

As described above, period of time DT becomes smaller and smaller over time. Thus, respective values G1, G2, G3, etc., also become smaller and smaller, which is indicated by curve 24 of FIG. 3. The continuous decline in curve 24 thus represents the deterioration of the storage catalyst, for example, its aging and/or poisoning.

Over time, however, internal combustion engine 1 may also undergo changes. Due to aging phenomena and similar phenomena, the compression of internal combustion engine 1 may be reduced, resulting in an increase in hydrocarbon emissions and a reduction in NOx emissions.

The reduction in NOx components in the exhaust gas of internal combustion engine 1 also may have consequences for the loading and unloading of the storage catalyst. For example, the storage catalyst may become loaded with a smaller amount of NOx in the same loading period, in comparison with the results modeled by control unit 18. The model, as a function of which control unit 18 controls and/or regulates the switching between modes of operation of internal combustion engine 1, thus may no longer correspond to the actual condition of the storage catalyst.

The difference between the model of control unit 18 and the actual condition of the storage catalyst may result in curve 24 no longer dropping monotonically after a certain period of time, but instead increasing again. The change in curve 24 is marked at point 25. Then, a change in NOx emissions of internal combustion engine 1 may be determined by control unit 18 from the rise of curve 24, as described above.

Control unit 18 then adapts the model of the storage catalyst, so that curve 24 again drops monotonically. This occurs after point 26 of FIG. 3. For example, control unit 18, may adapt the loading and unloading times of the storage catalyst, so that the times for switching between the modes of operation of internal combustion engine 1 again correspond to the actual loading state of the storage catalyst.

As also indicated by curve 24 of FIG. 3, the slope of curve 24 changes before the transition to a rise, i.e., before point 25. In curve 3 the slope of curve 24 becomes greater continuously, so that curve 24 drops more before point 25.

From this change in slope of curve 24, control unit 18 may also deduce a change in the NOx components in the exhaust of internal combustion engine 1, for example, and may make appropriate adjustments to correct the model of the storage catalyst. In this connection, changes in the slope of curve 24 may be detected in a positive and a negative direction, and appropriate adjustments may be made depending on the findings.

What is claimed is:

1. A method of operating an internal combustion engine of a motor vehicle, in which fuel is injected into a combustion chamber in a rich mode of operation and in a lean mode of operation, in which switching takes place between the rich mode of operation and the lean mode of operation, and in which nitrogen oxides are stored in a catalyst, the method comprising:

determining a quality function for storing the nitrogen oxides in the catalyst as a function of a period of time, after which the rich mode of operation breaks through the catalyst, and as a function of a plurality of consecutive periods of time; and determining a change in a slope of the quality function and influencing the switching between the rich mode of operation and the lean mode of operation as a function of the slope of the quality function.

2. The method of claim 1, wherein the switching between the rich mode of operation and the lean mode of operation is adapted.

3. The method of claim 2, wherein at least one of a loading time and an unloading time for the storing of the nitrogen oxides in the catalyst is adapted.

4. A computer program for an internal combustion engine of a motor vehicle, the computer program comprising:
- a series of commands for performing a process, the process including:
  - determining a quality function for storing nitrogen oxides in a catalyst as a function of a period of time, after which a rich mode of operation breaks through the catalyst, and as a function of a plurality of consecutive periods of time; and
  - determining a change in a slope of the quality function and influencing a switching between the rich mode of operation and a lean mode of operation as a function of the slope of the quality function.

5. The computer program of claim 4, wherein the series of commands are stored on a computer-readable data medium.

6. An internal combustion engine system of a motor vehicle, the system comprising:
- a combustion chamber to receive injected fuel in a rich mode of operation and in a lean mode of operation;
- a catalyst to store nitrogen oxides; and
- a control unit to switch between the rich mode of operation and the lean mode of operation;
- wherein the control unit is operable to:
  - determine quality function for storing the nitrogen oxides in the catalyst is as a function of a period of time, after which the rich mode of operation breaks through the catalyst, and as a function of a plurality of consecutive periods of time; and
  - determine a change in a slope of the quality function and influence the switching between the rich mode of operation and the lean mode of operation as a function of the slope of the quality function.

7. A control unit for use in an internal combustion engine of a motor vehicle, the internal combustion engine including a combustion chamber into which fuel is injected in a rich mode of operation and in a lean mode of operation, and a catalyst for storing nitrogen oxides, the control unit comprising:
- a control arrangement to switch between the rich mode of operation and the lean mode of operation, and being operable to:
  - determine a quality function for storing the nitrogen oxides in the catalyst as a function of a period of time, after which the rich mode of operation breaks through the catalyst, and as a function of a plurality of consecutive periods of time; and
  - determine a change in a slope of the quality function and influence the switching between the rich mode of operation and the lean mode of operation as a function of the slope of the quality function.

* * * * *